Jan. 2, 1951 R. H. LA FLEUR 2,536,553
CASTING LURE
Filed Feb. 21, 1946
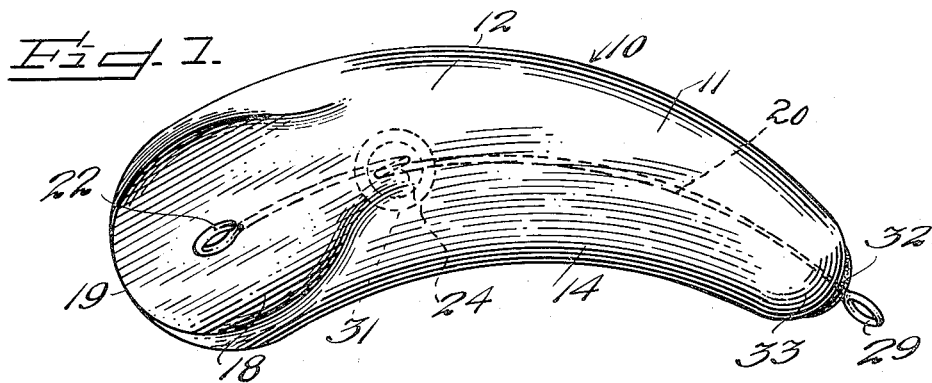
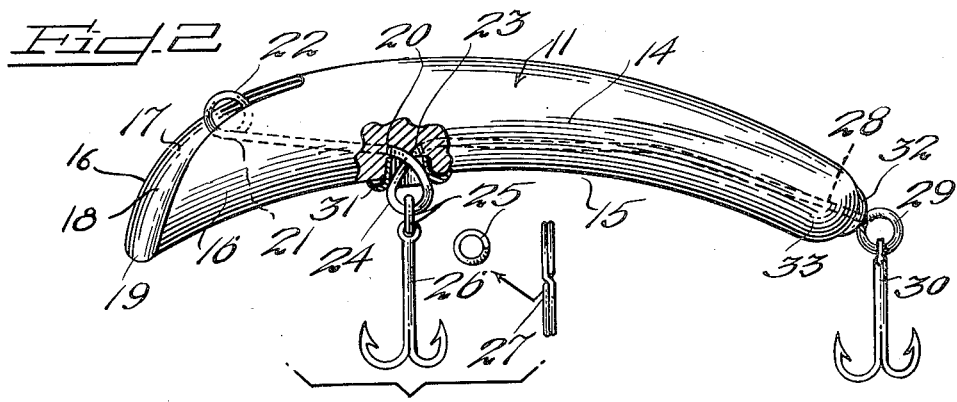
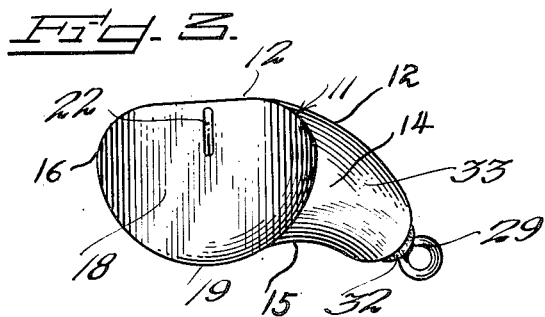
Inventor
Robert H. LaFleur
By Clarence A. O'Brien
and Harvey B. Jacobson
Attorneys Patented Jan. 2, 1951

2,536,553

UNITED STATES PATENT OFFICE 2,536,553

CASTING LURE

Robert H. La Fleur, Ferndale, Mich.

Application February 21, 1946, Serial No. 649,148

2 Claims. (Cl. 43—42.48)

The invention as described herein, and illustrated in the accompanying drawings, consists of a plug or casting lure, an object of which is to provide a lure so formed as to swerve and swish from side to side very rapidly or slowly according to the speed of the retrieving line.

Another object of the invention is to provide a plug having an arcuate body and a channelled head.

A primary object of the invention is the provision of means in a lure whereby the same will bob up and down as well as wiggle from side to side.

Other features and advantages will become more readily apparent from the following description and the accompanying illustrative drawings in which:

Figure 1 is a top plan view of the lure,

Figure 2 is a side elevational view thereof, together with details, and

Figure 3 is a front elevational view of the device.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention and 11 indicates the body of the plug, the top 12 of which is convex, the side wall 14 concave and the bottom wall 15 concave. The head 16 of the device is provided with a channel 17 with a wall 18 inclining to a lower feather edge 19.

Embedded in and throughout the length of the body 11 is a wire 20, one end 21 of which forms an eye 22 partly projecting through the head wall 18. Intermediate the ends of the wire, but nearer the head end of the body, a loop 23 is provided which forms an eye 24 projecting from the belly portion of the device to receive an open ring 25 to which a cluster fish hook 26 is connected. If found preferable, a double open ring 27 may be substituted for the ring 25. The extreme rear end 28 of the wire projects through the tail end 33 of the body and is formed to an eye 29 to support the hook or hooks 30. Washers 31, 32, etc. may be provided on the wire at the points where it extends from said body.

To the eye 22 is attached a line (not shown), the drawing upon which causes the feather edge 19 of the head to cut down into the water and the body to bob up and down while the curvature of the convex and concave walls of the body causes a wiggling motion of the lure as it is drawn through the water giving the same a very lifelike agility.

This lure may be made in sizes varying from that of a "muskelouge" to the small trout or fly rod size and is preferably to be made of colored plastic colored according to size and nature of bait desired.

It will become apparent from the above description that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthly description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. A fishing lure comprising an elongated body having a concaved lower surface, a convexed upper surface, a concaved side surface and a convexed side surface, said body having leading and trailing ends, said body having a front face sloping rearwardly from the convexed side surface of the body toward the concaved side of the body.

2. A fishing lure comprising an elongated body having forward and rear ends, a first convex side surface and a second concave side surface, said forward end having a face sloping rearwardly from the first side surface to the second side surface, and said face also sloping downwardly and forwardly from the upper periphery of the body to the lower periphery of the body.

ROBERT H. LA FLEUR.

REFERENCES CITED

The following references are of record in the file of this patent:

UNITED STATES PATENTS

| Number | Name | Date |
|---|---|---|
| 1,209,641 | Olds | Dec. 19, 1916 |
| 1,472,638 | Dickman | Oct. 30, 1923 |
| 1,745,006 | Chapleau | Jan. 28, 1930 |
| 1,752,706 | Sobecki | Apr. 1, 1930 |
| 1,777,004 | Lemere et al. | Sept. 30, 1930 |
| 1,854,028 | Gruenhagen | Apr. 12, 1932 |
| 2,238,900 | Hadaway | Apr. 22, 1941 |
| 2,314,907 | Sweeney | Mar. 30, 1943 |
| 2,443,124 | Sullivan | June 8, 1948 |